US012591683B2

(12) United States Patent
Liu

(10) Patent No.: US 12,591,683 B2
(45) Date of Patent: Mar. 31, 2026

(54) REDUCING START UP TIMES IN DEVICE IDENTITY COMPOSITION ENGINE (DICE) DEVICES

(71) Applicant: Micron Technology, Inc., Boise, ID (US)

(72) Inventor: Zhan Liu, Cupertino, CA (US)

(73) Assignee: Micron Technology, Inc., Boise, ID (US)

( * ) Notice: Subject to any disclaimer, the term of this patent is extended or adjusted under 35 U.S.C. 154(b) by 201 days.

(21) Appl. No.: 17/887,330

(22) Filed: Aug. 12, 2022

(65) Prior Publication Data

US 2024/0054223 A1 Feb. 15, 2024

(51) Int. Cl.
*G06F 21/57* (2013.01)
*G06F 9/4401* (2018.01)

(52) U.S. Cl.
CPC .......... *G06F 21/575* (2013.01); *G06F 9/4401* (2013.01); *G06F 2221/034* (2013.01)

(58) Field of Classification Search
CPC . G06F 21/575; G06F 9/4401; G06F 2221/034
See application file for complete search history.

(56) References Cited

U.S. PATENT DOCUMENTS

| | | | | | |
|---|---|---|---|---|---|
| 5,544,312 | A | * | 8/1996 | Hasbun | G06F 1/30 714/14 |
| 8,479,049 | B2 | * | 7/2013 | Peng | G06F 1/28 714/36 |
| 8,874,892 | B1 | * | 10/2014 | Chan | G06F 21/572 713/100 |
| 2005/0273587 | A1 | * | 12/2005 | Wynn | G06F 9/442 711/170 |
| 2013/0013905 | A1 | * | 1/2013 | Held | G06F 21/572 713/2 |
| 2013/0125244 | A1 | * | 5/2013 | Sugano | G06F 21/57 726/26 |
| 2014/0040605 | A1 | * | 2/2014 | Futral | G06F 9/445 713/2 |
| 2018/0349046 | A1 | * | 12/2018 | Yang | G06F 1/3275 |
| 2020/0193065 | A1 | * | 6/2020 | Smith | G06F 21/73 |
| 2020/0327232 | A1 | * | 10/2020 | Sella | G06F 18/22 |
| 2021/0390185 | A1 | * | 12/2021 | Rogala | G06F 21/44 |

OTHER PUBLICATIONS

DICE Certificate Profiles (Year: 2020).*
Microchip application note TB3268 (Year: 2022).*

* cited by examiner

*Primary Examiner* — David J Pearson
(74) *Attorney, Agent, or Firm* — Greenberg Traurig

(57) ABSTRACT

In some aspects, the techniques described herein relate to a system including: a storage array; a controller configured to detect a shutdown event; and an auto-measure circuit configured to: generate a plurality of measurements corresponding to a plurality of layers of a boot sequence, each layer including executable code used to generate a respective measurement; compare the plurality of measurements to a respective plurality of golden measurements; update flags associated with the plurality of layers based on the comparing; and instruct the controller to shut down the system after updating the flags.

17 Claims, 6 Drawing Sheets

500

504

REDUCING START UP TIMES IN DEVICE IDENTITY COMPOSITION ENGINE (DICE) DEVICES

FIELD OF THE TECHNOLOGY

At least some embodiments disclosed herein generally relate to memory devices (e.g., semiconductor memory devices) incorporating a layered authentication protocol and, in particular, to improvements in securely booting systems utilizing such devices.

BACKGROUND

Various computing devices utilize securing booting procedures to ensure that installed firmware or software is valid before fully booting. Examples of such techniques are referred to as secure booting or measured booting. In a system implementing a layered boot process, such as a Device Identity Composition Engine (DICE) system, each layer must be measured in sequence upon boot, which increases the boot time of such a device.

DETAILED DESCRIPTION

Figure 1:
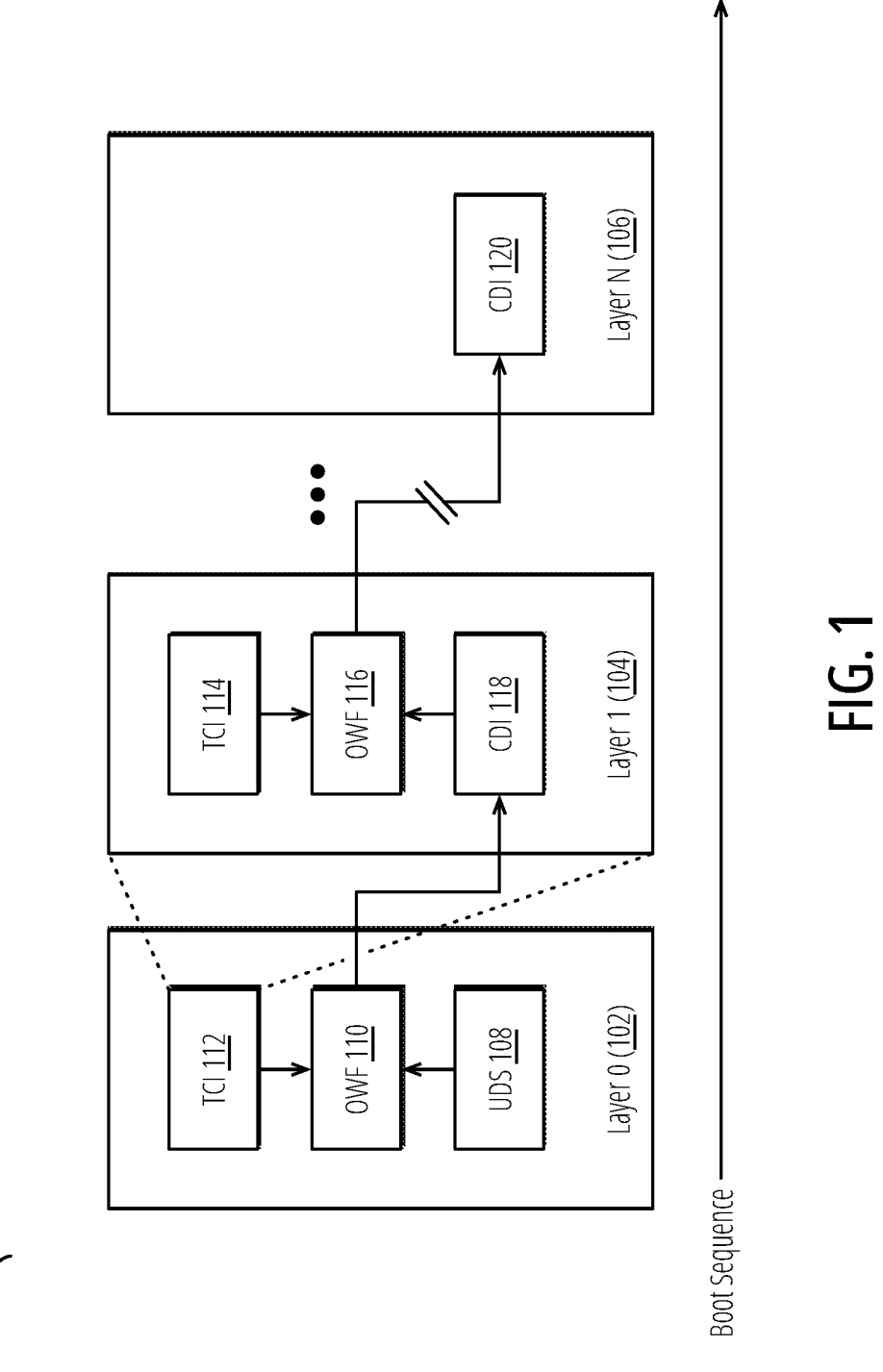
FIG. 1 is a block diagram illustrating a layered boot process.

The disclosure remedies these and other deficiencies in existing layered computing systems by providing an improved boot procedure that provides the benefits of secure or measured booting while avoiding latency during startup.

In layered boot devices (e.g., DICE devices), measuring of each layer during a boot sequence requires significant computational resources and necessarily increases the boot time of such devices. Therefore, reducing the time and computational penalty of measuring during boot is critical to ensuring a rapid boot time. In this disclosure, a system automatically reboots after a shutdown and performs layer measurements during the forced reboot. Each layer is associated with a flag that indicates if the layer is compromised or not (based on the measurement) which is set during the forced reboot. In some implementations, the system can alert or notify a user (e.g., via text message) to indicate when a measurement fails (in addition to setting the flag appropriately). This notification can include detail on the compromised layer. Next, the system will fully shutdown and power off. When the system boots again, the system will check the flags for each layer as they are loaded in memory. If a flag is positive (i.e., the layer is not compromised), the system will execute the layer and set the flag to negative. For a positive flag, the system will bypass measuring the layer. If, however, the flag for a layer is negative (i.e., the layer was determined to be compromised during the last shutdown), the system can handle the compromised layer accordingly. In some implementations, this can include re-measuring the layer, rolling back the layer firmware/software, booting to safe mode, continued booting while warning the user, or similar type of recovery mechanism.

The foregoing summary illustrates various benefits of the systems and methods described in more detail herein. First, the disclosure decreases the boot time of a layered boot device due to performing measurements at shutdown rather than startup. Second, the disclosure can notify user's earlier (e.g., after shutdown) of potentially compromised layers, enabling users to take remedial measures earlier.

In some aspects, the techniques described herein relate to a system including: a storage array; a controller configured to detect a shutdown event; and an auto-measure circuit configured to: generate a plurality of measurements corresponding to a plurality of layers of a boot sequence, each layer including executable code used to generate a respective measurement; compare the plurality of measurements to a respective plurality of golden measurements; update flags associated with the plurality of layers based on the comparing; and instruct the controller to shut down the system after updating the flags.

In some aspects, the techniques described herein relate to a system, the controller further configured to perform a forced reboot after detecting the shutdown event and before generating the plurality of measurements.

In some aspects, the techniques described herein relate to a system, wherein a given measurement in the plurality of measurements includes a hash of a corresponding layer's executable code.

In some aspects, the techniques described herein relate to a system, wherein the hash includes a trusted computing base component identifier (TCI).

In some aspects, the techniques described herein relate to a system, wherein updating flags includes setting a flag to a positive value if a corresponding measurement matches an expected golden measurement and setting the flag to a negative value if a corresponding measurement does not match an expected golden measurement.

In some aspects, the techniques described herein relate to a system, the auto-measure circuit further configured to: detect a startup event; select a layer from the plurality of layers; read a flag associated with the layer; execute the layer if the flag is set to a positive value and setting the flag to a negative value after executing the layer; and prevent execution of the layer if the flag is set to a negative value.

In some aspects, the techniques described herein relate to a system, wherein preventing execution of the layer includes one or more of: re-computing a new measurement of the layer, comparing the new measurement to a corresponding golden measurement, and executing the layer if the new measurement matches the corresponding golden measurement; rolling back the layer to a previous version of the layer; booting to safe mode; and alerting a user that the layer is compromised.

In some aspects, the techniques described herein relate to a method including: detecting a shutdown event of a device; generating a plurality of measurements corresponding to a plurality of layers of a boot sequence, each layer including executable code used to generate a respective measurement; comparing the plurality of measurements to a respective plurality of golden measurements; updating flags associated with the plurality of layers based on the comparing; and shutting down the device after updating the flags.

In some aspects, the techniques described herein relate to a method, further including perform a forced reboot after detecting the shutdown event and before generating the plurality of measurements.

In some aspects, the techniques described herein relate to a method, wherein a given measurement in the plurality of measurements includes a hash of a corresponding layer's executable code.

In some aspects, the techniques described herein relate to a method, wherein the hash includes a trusted computing base component identifier (TCI).

In some aspects, the techniques described herein relate to a method, wherein updating flags includes setting a flag to a positive value if a corresponding measurement matches an expected golden measurement and setting the flag to a negative value if a corresponding measurement does not match an expected golden measurement.

In some aspects, the techniques described herein relate to a method, further including: starting up the device; selecting a layer from the plurality of layers; reading a flag associated with the layer; executing the layer if the flag is set to a positive value and setting the flag to a negative value after executing the layer; and preventing execution of the layer if the flag is set to a negative value.

In some aspects, the techniques described herein relate to a method, wherein preventing execution of the layer includes one or more of: re-computing a new measurement of the layer, comparing the new measurement to a corresponding golden measurement, and executing the layer if the new measurement matches the corresponding golden measurement; rolling back the layer to a previous version of the layer; booting to safe mode; and alerting a user that the layer is compromised.

In some aspects, the techniques described herein relate to a non-transitory computer-readable storage medium for tangibly storing computer program instructions capable of being executed by a computer processor, the computer program instructions defining steps of: detecting a shutdown event of a device; generating a plurality of measurements corresponding to a plurality of layers of a boot sequence, each layer including executable code used to generate a respective measurement; comparing the plurality of measurements to a respective plurality of golden measurements; updating flags associated with the plurality of layers based on the comparing; and shutting down the device after updating the flags.

In some aspects, the techniques described herein relate to a non-transitory computer-readable storage medium, further including perform a forced reboot after detecting the shutdown event and before generating the plurality of measurements.

In some aspects, the techniques described herein relate to a non-transitory computer-readable storage medium, wherein a given measurement in the plurality of measurements includes a hash of a corresponding layer's executable code.

In some aspects, the techniques described herein relate to a non-transitory computer-readable storage medium, wherein the hash includes a trusted computing base component identifier (TCI).

In some aspects, the techniques described herein relate to a non-transitory computer-readable storage medium, wherein updating flags includes setting a flag to a positive value if a corresponding measurement matches an expected golden measurement and setting the flag to a negative value if a corresponding measurement does not match an expected golden measurement.

In some aspects, the techniques described herein relate to a non-transitory computer-readable storage medium, further including: starting up the device; selecting a layer from the plurality of layers; reading a flag associated with the layer;

executing the layer if the flag is set to a positive value and setting the flag to a negative value after executing the layer; and preventing execution of the layer if the flag is set to a negative value.

FIG. 1 is a block diagram illustrating a layered boot process.

As illustrated, a system 100 includes various layers. These layers can include a base layer 102, a first layer 104, and a final layer 106. System 100 is not limited to only the illustrated layers and, as depicted, other layers may be situated between first layer 104 and final layer 106, which operate similar to the functionality described herein. Each layer represents hardware, firmware, and/or software functionality and each layer may be designed according to the systems needs. As one example, base layer 102 can be a combination of hardware and immutable firmware to perform an initial measurement, first layer 104 can be a first stage bootloader, and final layer 106 can be a high-level operating system. Certainly, other functionality may be present in each layer.

In system 100, layers are booted (i.e., executed) in sequence or series. That is, base layer 102 executes before first layer 104 and first layer 104 executes before final layer 106. In a layered boot process (such as DICE), layers only execute when they are not compromised and layers are verified prior to launching, as will be discussed.

Each layer includes a one-way function (OWF) used to compute a component device identifier (CDI) for the next layer. The OWF can be a hash function such as a SHA-256 or hash-based message authentication code (HMAC) function. In base layer 102, a OWF 110 uses a unique device secret (UDS 108) and a trusted computing base component identifier (TCI 112) to generate CDI 118 for first layer 104. The UDS 108 can comprise any unique and tamper-proof value associated with a given device. For example, a physically unclonable function (PUF) can be used to generate UDS 108. Alternatively, an Elliptical Curve Diffie-Hellman protocol can be used to generate a UDS 108. Generally, any mechanism that can guaranteed a unique and secure value can be used to generate UDS 108.

Base layer 102 generates TCI 112 by measuring aspects of first layer 104. In an implementation, base layer 102 can measure the executable code of first layer 104 (e.g., compute a hash of the raw binary contents of the software). Alternatively, or in conjunction with the foregoing, various metadata and configuration settings of first layer 104 can be incorporated into the measured data. As indicated, a measurement may be a fixed length hash of the data to measure. Generally, measuring the first layer 104 includes loading (e.g., reading) the required data and computing a potentially computationally expensive hash of the data. Base layer 102 then computes a fixed value (CDI 118) for first layer 104 and first layer 104 can store CDI 118 in a known location (e.g., register, non-volatile storage device, etc.).

As illustrated, the same process can be repeated by each layer. Specifically, first layer 104 can compute the CDI for the next layer, the next layer can compute the CDI for the next layer, etc. until Layer N−1 computes the CDI 120 for the final layer 106. Thus, in first layer 104, a OWF 116 computes the CDI of the next layer using a measurement of the next layer, TCI 114, and the CDI 118 received from the previous layer. Ultimately, the final layer 106 can use the CDI 120 to generate, for example, cryptographic keys and other secure data. Since the CDI 120 is formed from a chain of computed CDIs, the resulting keys can be guaranteed to be secure.

As illustrated, the foregoing layered boot process relies on measurements of layers performed by preceding layers. As a requirement, base layer 102 must be immutable and guaranteed to be secure. Oftentimes, base layer 102 is implemented in hardware or via immutable firmware code (e.g., in read-only memory). In some implementations, each layer is configured to only pass control to the next layer if the measured value (e.g., TCI) matches an expected value (also referred to as a golden measurement). Thus, if base layer 102 determines that TCI 112 does not match an expected value, base layer 102 can halt booting and prevent malicious code in first layer 104 from executing. In other words, a layer only executes after a prior trusted layer verifies the measurement of the layer and thus a malicious layer cannot execute.

However, as discussed above, computing TCI values for each layer is time-consuming and computationally expensive. As a result, most layered boot devices (e.g., DICE devices) suffer from long boot times.

Figure 2:
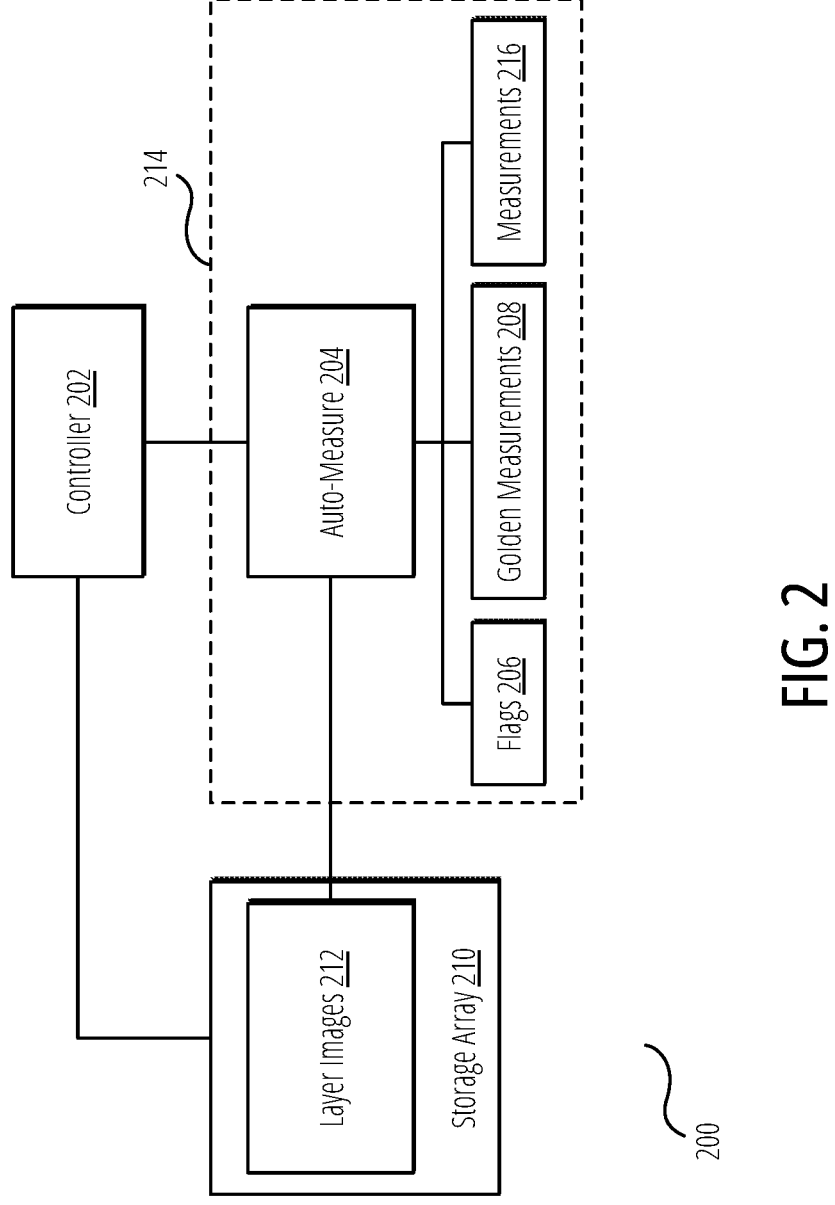
FIG. 2 is a block diagram illustrating a system for securely booting a layered boot device.

FIG. 2 is a block diagram illustrating a system for securely booting a layered boot device The system 200 includes a controller 202 that accesses data (such as a layer images 212) stored in a storage array 210. The system 200 further includes a security perimeter 214, such as a hardware security module (HSM), trusted platform module (TPM), secure enclave, trusted execution environment (TEE), or similar secure computing platform. The security perimeter 214 includes an auto-measure circuit 204, flag storage 206, golden measurement storage 208, and layer measurement storage 216. Details of these components are described in more detail herein.

At its core, the system 200 includes a storage array 210. Storage array 210 may also be referred to as an electronic memory apparatus. Storage array 210 includes memory cells that are programmable to store different states. Each memory cell may be programmable to store two states, denoted a logic 0 and a logic 1. In some cases, a memory cell is configured to store more than two logic states. A memory cell may store a charge representative of the programmable states in a capacitor; for example, a charged and uncharged capacitor may represent two logic states, respectively. DRAM architectures may commonly use such a design, and the capacitor employed may include a dielectric material with linear or paraelectric electric polarization properties as the insulator. By contrast, a ferroelectric memory cell may include a capacitor with a ferroelectric as the insulating material. Different levels of charge of a ferroelectric capacitor may represent different logic states. Ferroelectric materials have non-linear polarization properties; some details and advantages of a ferroelectric memory cell are discussed below.

Storage array 210 may be a three-dimensional (3D) memory array, where two-dimensional (2D) memory arrays are formed on top of one another. This may increase the number of memory cells that may be formed on a single die or substrate as compared with 2D arrays, which in turn may reduce production costs or increase the performance of the memory array, or both. Storage array 210 can include two levels of memory cells and may thus be considered a three-dimensional memory array; however, the number of levels is not limited to two. Each level may be aligned or positioned so that memory cells may be approximately aligned with one another across each level, forming a memory cell stack.

In some embodiments, memory cells of the storage array 210 may be chalcogenide-based memory cells that are arranged with other such memory cells in a three-dimensional (3D) architecture, such as a cross-point architecture, or arranged in a three-dimensional (3D) vertical architecture. Cross-point memory (e.g., 3D XPoint memory) uses an array of non-volatile memory cells. The memory cells in cross-point memory are transistor-less. Each of such memory cells can have a selector device and optionally a phase-change memory device that are stacked together as a column in an integrated circuit. Memory cells of such columns are connected in the integrated circuit via two layers of wires running in directions that are perpendicular to each other. One of the two layers is above the memory cells, and the other layer is below the memory cells. Thus, each memory cell can be individually selected at a cross point of two wires running in different directions in two layers. Crosspoint memory devices are fast and non-volatile and can be used as a unified memory pool for processing and storage.

In some implementations, the cross-point memory uses a memory cell that has an element (e.g., a sole element) acting both as a selector device and a memory device. For example, the memory cell can use a single piece of alloy with variable threshold capability. The read/write operations of such a memory cell can be based on thresholding the memory cell while inhibiting other cells in sub-threshold bias, in a way similar to the read/write operations for a memory cell having a first element acting as a selector device and a second element acting as a phase-change memory device that are stacked together as a column. A selector device usable for storing information can be referred to as a selector/memory device.

Such a self-selecting memory cell, having a selector/memory device, can be programmed in cross-point memory to have a threshold voltage window. The threshold voltage window can be created by applying programming pulses with opposite polarity to the selector/memory device. For example, the memory cell can be biased to have a positive voltage difference between two sides of the selector/memory device and, alternatively, to have a negative voltage difference between the same two sides of the selector/memory device. When the positive voltage difference is considered in positive polarity, the negative voltage difference is considered in negative polarity, which is opposite to the positive polarity. Reading can be performed with a given/fixed polarity. When programmed, the memory cell has a low threshold (e.g., lower than the cell that has been reset or a cell that has been programmed to have a high threshold), such that during a read operation, the read voltage can cause a programmed cell to snap and thus become conductive while a reset cell remains non-conductive.

The storage array 210 can store various persistent data used by controller 202. In some implementations, the controller 202 can be part of, and the system 200 can comprise, a storage device (e.g., solid-state drive) used in such a network. As illustrated, one type of data stored in storage array 210 includes layer images 212. In general, controller 202 can read the layer images 212 from the storage array 210 and return the layer images 212 to another computing device for execution. In other implementations, controller 202 may execute the layer images 212 directly.

As illustrated, controller 202 may communicate with the auto-measure circuit 204 during access operations performed on the storage array 210. For example, controller 202 may communicate with the auto-measure circuit 204 during shutdown (described in more detail in the description of FIG. 3) and startup (described in more detail in the description of FIG. 4).

In brief, during shutdown, controller 202 can instruct the auto-measure circuit 204 to initiate an auto-measurement procedure wherein the auto-measure circuit 204 measures the layer images 212 to obtain new measurements. The auto-measure circuit 204 can then compare the new measurements to the values in the golden measurement storage 208. If the values are equal, the auto-measure circuit 204 can positively update the flag storage 206 for each layer. If not, the auto-measure circuit 204 can negatively update the flag storage 206 for each layer. Further, if the values do not match, the auto-measure circuit 204 can inform controller 202, which can initiate remedial actions such as notifying a user (via a computing device). Further detail on a shutdown procedure is provided in the description of FIG. 3 and is not repeated herein.

During startup, controller 202 may cede control to auto-measure circuit 204 to confirm that the layer images 212 are valid prior to returning the layer images 212 to another computing device or executing the layer images 212 directly. The auto-measure circuit 204 may read one or more bits from the flag storage 206 and determine if the layer images 212 are valid based on the one or more bits in the flag storage 206. For example, a designated bit of the flag storage 206 may be set to logical one if a corresponding layer image is valid and logical zero if the corresponding layer image is invalid. If the auto-measure circuit 204 determines that a layer image is valid, it transmits a message or response to controller 202, and controller 202 can then return or execute the layer image. Conversely, if the auto-measure circuit 204 determines that the any of layer images 212 are invalid, it can initiate a new measurement of the compromised layer images and compare the new measurement to the value stored in golden measurement storage 208. If the values are equal, the auto-measure circuit 204 can similarly transmit a message or response to controller 202, and controller 202 can then return or execute the layer images 212. By contrast, if the new measurement is not equal to the value stored in golden measurement storage 208, the auto-measure circuit 204 can transmit a message to controller 202 indicating as such and controller 202 can halt booting of the layer images 212 (or perform other types of remedial measures, described later). Further detail on a startup procedure is provided in the description of FIG. 4 and is not repeated herein.

Figure 3:
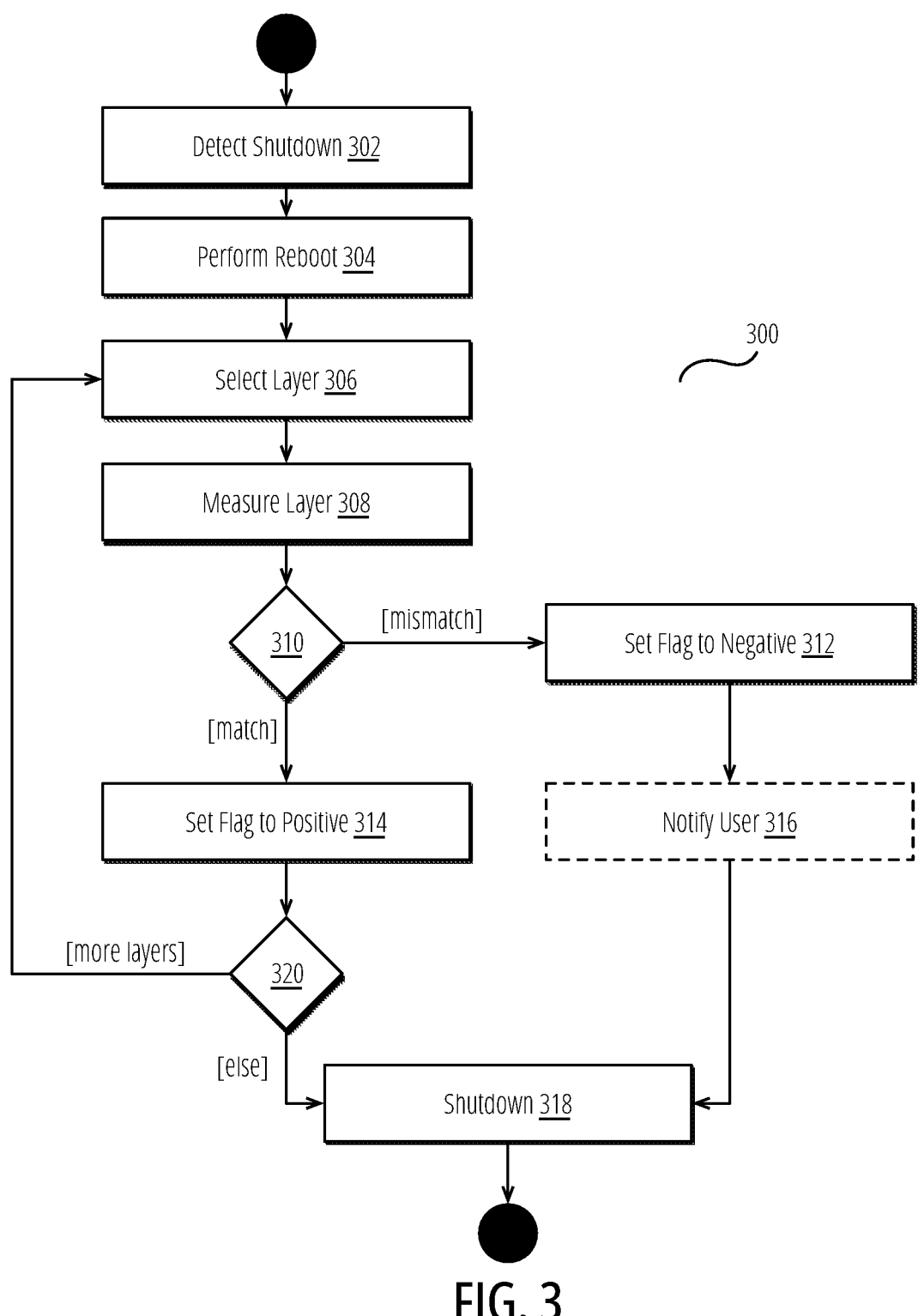
FIG. 3 is a flow diagram illustrating a method for shutting down a computing system.

FIG. 3 is a flow diagram illustrating a method for shutting down a computing system.

In step 302, method 300 can include detecting a shutdown event. In the various implementations, shutting down may involve numerous steps not relevant to method 300. However, shutting down will involve issuing a command to a memory device to commence shutting down. As such, in some implementations, step 302 includes a memory device detecting a shutdown event. In general, the host device may await a confirmation from the memory device of handling the shutdown event before fully shutting down. Thus, in some implementations, method 300 can be implemented before the system completely shuts down (or otherwise is suspended).

In step 304, method 300 can include rebooting the memory device. In some implementations, step 304 can include setting a configuration setting indicating that the reboot is forced. As such, this will enable the memory device to fully shutdown (step 318) after performing the various steps described herein. Further, such a setting can ensure that measurement is performed, while (as described in FIG. 4), normal reboots do not perform such measurements. In some implementations, step 304 may be optional and method 300 may instead proceed to measure layers starting with step 306 without rebooting.

In step 306, method 300 can include selecting a layer. As discussed previously, a layer refers to a set of functionalities that represents a stage during a boot process. In some implementations, step 306 can be implemented as part of the boot process in that each layer is sequentially loaded unless method 300 halts booting (described herein). Thus, as one example, a base layer (e.g., DICE core) can execute first, then a first layer, a second layer, etc. until the system is fully booted.

In step 308, method 300 can include measuring the selected layer. As discussed in FIG. 1, in some implementations, method 300 can measure a selected layer by computing a hash over the executable code and, if desired, other aspects of the layer. In some implementations, a hash function (e.g., SHA-256, HMAC, etc.) can be used to compute the measurement. In some implementations, an HMAC can use its own measurement (or a unique value) as a key and the contents of the next layer as the message when computing the measurement of the next layer. Thus, as one example, a base (e.g., DICE) layer can use a UDS and the contents of the first layer to compute the measurement (e.g., TCI) of the first layer, the first layer can use the measurement computed by the base layer and the contents of the second layer to compute the measurement of the second layer, etc.

In step 310, method 300 can include determining if the measurement of the selected layer matches an expected measurement.

In some implementations, this expected measurement is referred to as a golden measurement. In some implementations, the golden measurements can be written by a manufacturer to a secure area of the memory device (e.g., a write-protected region). In some implementations, the golden measurements can only be updated via a secure command (e.g., a command signed by an authenticated device using asymmetric cryptography). For example, when a layer is updated, a secure command requesting the updated can be issued and validated. Then, the device can re-generate a golden measurement in response to this authenticated command.

In some implementations, the comparison between the measurement of a layer and its golden measurement is either true or false (e.g., match or mismatch). If method 300 determines that the measurement is a mismatch, method 300 can set a flag for the layer as negative (step 312). Conversely, if method 300 determines that the measurement is a match, method 300 can set a flag for the layer as positive (step 314). Details regarding layer flags are provided further herein. For layers having measurements matching the golden measurements, method 300 proceeds to step 320 where method 300 determines if any other subsequent layers need to be booted. If so, method 300 repeats the foregoing process for each remaining layer.

In general, a flag refers to a bit (or multiple bits) that represents the state of a given layer. As discussed in FIG. 2, measurements can be stored during method 300 as the system reboots. In general, these measurements are securely written to a write-protected region or other secure region of the device to prevent tampering. In some implementations, each of these measurements can be associated with a flag (as used herein, a bit flag) that succinctly describes whether the measurement matched or did not match the golden measurement. In some implementations, this flag can be stored separately from the measurement. In some implementations, a single word can be used to store the flags for multiple layers. In other implementations, a preconfigured bit of the measurement can be used as the flag. For example, the least significant bit of the measurement can be set to one for a match or zero for a mismatch.

Thus, in step 312 and step 314, this bit flag is set for each layer as the system boots. Further, in some implementations, the corresponding measurements can be stored persistently for each layer, removing the requirement of measuring the layers during startup.

As illustrated, as an optional step, method 300 can include notifying a user if a measurement mismatch is detected (step 316). In one implementation, method 300 can include sending a text message, email, or similar type of message to a preset user device or account in response to detecting a measurement mismatch. In some implementations, this notification can include data related to the layer and/or measurement to allow the user to debug the device.

Once method 300 processes each layer, or when method 300 detects the first measurement mismatch, method 300 can fully shutdown the device (step 318). In some implementations, method 300 may process each layer, regardless of whether mismatches occur. For example, after step 316, method 300 can proceed to step 320 (and not step 318). In such a scenario, each layer after the first mismatched layer will necessarily have a negative flag set since the measurements will be based on a mismatched TCI or similar measurement.

In some implementations, the above reboot procedure can be invisible to the user. That is, in some implementations, the reboot process does not require user input and may not display any information to the user during the process. In some implementations, the device can read the reboot setting (set in step 304) to prevent visually or otherwise presenting information to the user. As such, the reboot is not evident to the user and the outward appearance of the device is one of shutting down (as requested). Thus, while the reboot and measurement process described above may increase the shutdown time of the device (due to the reboot), this is transparent to the user. Further, users are generally less concerned with the amount of time to shut down a device versus startup a device. Finally, in some environments (e.g., automotive), startup times are critical while shutdown times are negligible.

At the completion of method 300, a device is fully shutdown and persistently stores, for each layer, a pre-computed measurement and a corresponding flag indicating whether a given layer is compromised or not (i.e., did not have a measurement that matched an expected measurement). As is discussed next, these flags can be used to quickly boot a device and the measurements need not be performed during the next startup.

It should be noted that in some implementations, an initial value of the flags may be set by a manufacturer. Specifically, a manufacturer may explicitly set all flags for all layers as positive (e.g., binary one) during manufacturing since the manufacturer can control the layers and guarantee that the layers are not compromised. Thus, on first startup after release from manufacturing, method 400 may operate with all flags set to positive (allowing for booting to the final layer without measurement).

Figure 4:
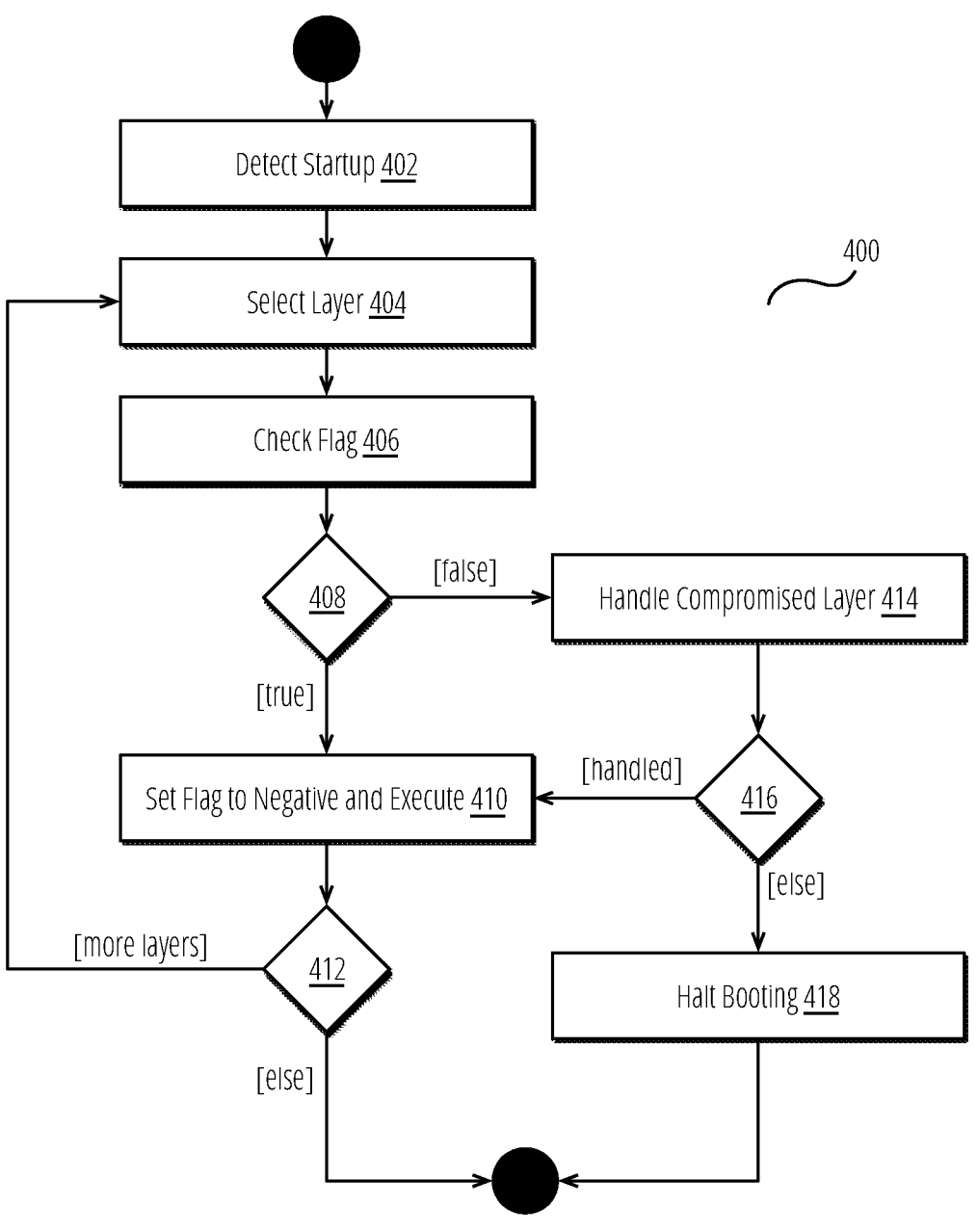
FIG. 4 is a flow diagram illustrating a method for starting up a computing system.

FIG. 4 is a flow diagram illustrating a method for starting up a computing system.

In step 402, method 400 can include detecting a startup of a device.

As discussed above, the device can be a memory device or can be a computing system that includes such a memory device. In general, booting may involve numerous steps not relevant to method 400. However, booting will involve accessing a memory device to read data from a storage array (generally a boot image or similar type of data). As such, in some implementations, step 402 includes a memory device detecting a boot or startup and, in some implementations, an attempt to access data stored in the storage array. In some implementations, the memory device stores locations of boot images and can thus detect accesses to such locations to trigger further processing.

In step 404, method 400 can include selecting a layer. As discussed previously, a layer refers to a set of functionalities that represents a stage during a boot process. In some implementations, step 404 can be implemented as part of the boot process in that each layer is sequentially loaded unless method 400 halts booting (described herein). Thus, as one example, a base layer (e.g., DICE core) can execute first, then a first layer, a second layer, etc. until the system is fully booted.

In step 406, method 400 can include checking a flag associated with a layer.

As discussed in FIG. 3, each layer is associated with a flag. A flag can be implemented as a pre-configured bit of a stored measurement or as a separate storage location. The contents of the flag are set by method 300 based on measuring the layer during a forced reboot prior to shutting down. In some implementations, the flag can be set to positive (e.g., binary one) or negative (e.g., binary zero).

In these implementations, the flag represents whether the selected layer is compromised or not. In step 408, method 400 branches based on the contents of the flag. If the flag is positive (i.e., the layer is not compromised), method 400 continues to boot by executing the layer. Specifically, in step 410, method 400 sets the flag to negative and executes the layer. Method 400 specifically sets the flag to negative since after executing and before shutting down, there is a potential risk that the layer will be compromised. Thus, setting the flag to negative ensure that the layer is not inadvertently marked as valid (e.g., in the event of a power failure that causes method 300 not to execute). During a normal shutdown, method 300 will execute and reset the flag based on the measurements as discussed above. Notably, as illustrated, if the flag is positive, method 400 will explicitly bypass performing a measurement of a layer, thus improving boot times.

An example of the foregoing steps is provided herein. During startup, an immutable DICE executes first (e.g., base layer 102 of FIG. 1). In contrast to layered boot systems, the TCI of Layer 1 (e.g., first layer 104 of FIG. 1) is not computed by the DICE. Rather, the DICE first reads the flag of Layer 1 and determines if the Layer 1 code is compromised or not. If the Layer 1 code is not compromised (e.g., the flag is set to positive), the DICE also does not re-compute the TCI of Layer 1 but rather reads the TCI from a write-protected storage region, thus avoiding an expensive TCI calculation. From that point, the DICE proceeds as normal, using the stored TCI and the UDS as inputs to the OWF to generate the CDI for Layer 1. At this point, Layer 1 executes since the flag was positive. Layer 1 can then repeat this workflow (as per step 412) by determining if the flag for Layer 2 is positive and, if so, reading the TCI for Layer 2 from the write-protected storage region. This process continues until Layer N is executed, unless a negative flag is read (discussed next).

In contrast to the foregoing, in some scenarios, method 400 will read a negative flag value in step 406 and step 408.

In this scenario, method 400 proceeds to step 414. In step 414, method 400 handles the compromised layer which can take various forms.

Specifically, a negative flag indicates that the measurement of the selected layer performed during the forced reboot did not match the golden measurement. As such, the selected layer is potentially compromised and generally, not as expected. In some implementations, step 414 can include re-measuring the compromised layer to confirm the mismatch. If the new measurement matches the golden measurement, in step 416, method 400 can deem the compromised layer as handled and proceed to step 410 as if the flag for the layer was positive. Alternatively, or in conjunction with the foregoing, method 400 can attempt to roll back the layer to a known state where the layer measurement will match the golden measurement (e.g., using a securely stored version of the layer code instead of the active code). Alternatively, or in conjunction with the foregoing, method 400 can boot into safe mode to allow for recovery of the layer. Various other recovery mechanisms may also be used.

Thus, there are various mechanisms that can be used to handle a compromised image. In step 416, if any of the mechanisms are successful, method 400 treats the layer as uncompromised and proceeds to step 410. If, however, none of the mechanisms are successful, method 400 can halt the booting of the device in step 418. In such a scenario, method 400 can display an error message or similar type of information to the user indicating why booting was not completed. Alternatively, or in conjunction with the foregoing, method 400 can alert the user using any of the mechanisms discussed in connection with step 316 of FIG. 3.

Another example of the foregoing steps is provided herein. During startup, an immutable DICE executes first (e.g., base layer 102 of FIG. 1). In contrast to layered boot systems, the TCI of Layer 1 (e.g., first layer 104 of FIG. 1) is not computed by the DICE. Rather, the DICE first reads the flag of Layer 1 and determines if the Layer 1 code is compromised or not. If the Layer 1 code is compromised (e.g., the flag is set to negative), the DICE handles this compromise by one or more of re-calculating the TCI and comparing it to a golden measurement, rolling back Layer 1, etc. If any of these mechanisms succeed, the DICE proceed as normal, using the TCI and the UDS as inputs to the OWF to generate the CDI for Layer 1.

As indicated in step 412, method 400 continues to check flags as it progresses through the various layers until reaching a final layer (e.g., final layer 106 of FIG. 1). As such, each layer is only executed when it is determined that it is not compromised. However, since method 400 uses the flags computed at shutdown (using method 300), method 400 can bypass the time consuming and computationally expensive measuring operations used in existing layered boot systems such as DICE.

Figure 5:
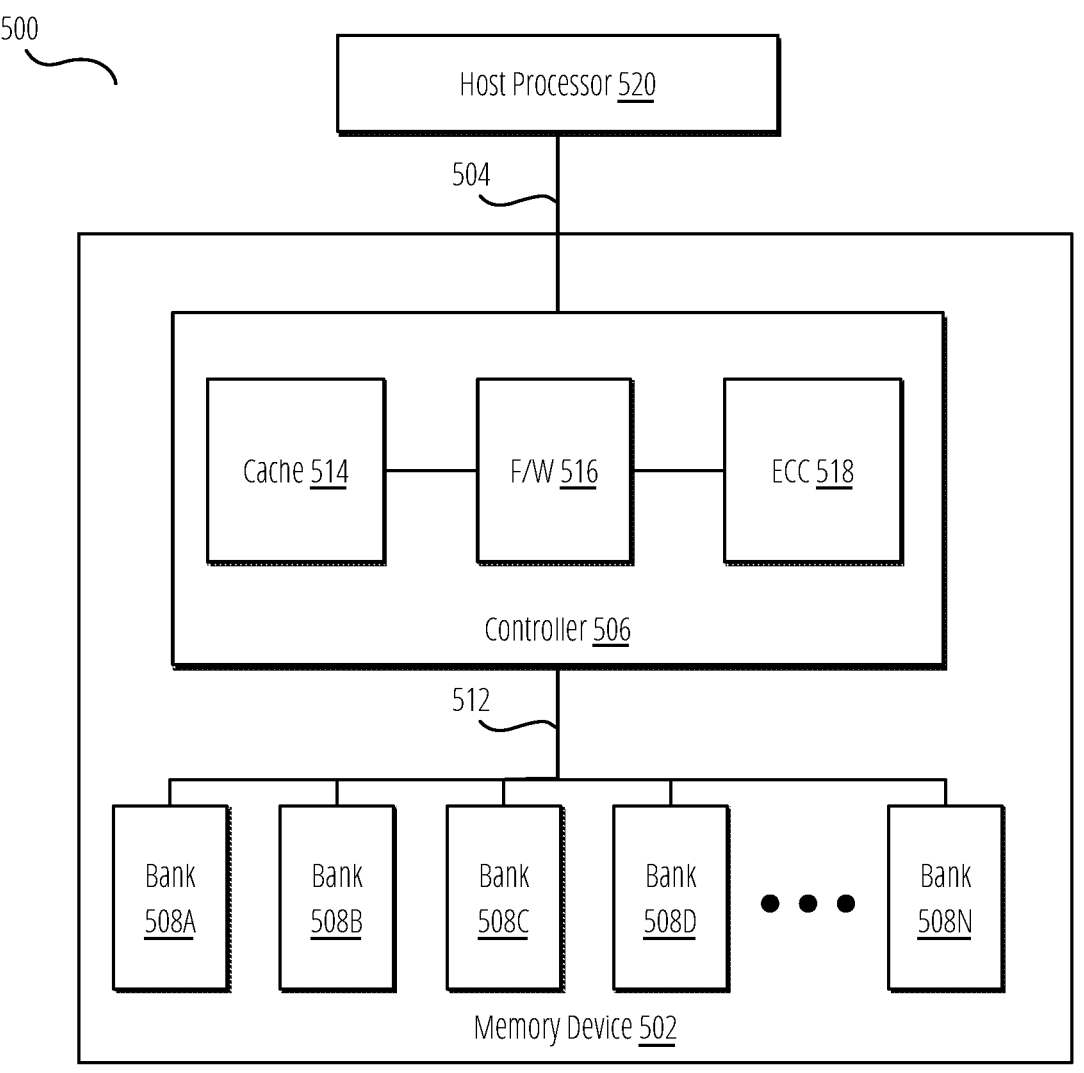
FIG. 5 is a block diagram illustrating a computing system.

FIG. 5 is a block diagram illustrating a computing system.

As illustrated in FIG. 5, a computing system 500 includes a host processor 520 communicatively coupled to a memory device 502 via a bus 504. The memory device 502 comprises a controller 506 communicatively coupled to one or more memory banks (e.g., bank 508A, bank 508B, bank 508C, bank 508D, bank 508N, etc.), forming a memory array via an interface 512. As illustrated, the controller 506 includes a local cache 514, firmware 516, and an ECC module 518.

In the illustrated embodiment, host processor 520 can comprise any type of computer processors, such as a central processing unit (CPU), graphics processing unit (GPU), or other types of general-purpose or special-purpose computing devices. The host processor 520 includes one or more output ports that allow for the transmission of address, user, and control data between the host processor 520 and the memory device 502. In the illustrated embodiment, this communication is performed over bus 504. In one embodiment, the bus 504 comprises an input/output (I/O) bus or a similar type of bus.

The memory device 502 is responsible for managing one or more memory banks (e.g., bank 508A, bank 508B, bank 508C, bank 508D, bank 508N, etc.). In one embodiment, the memory banks (e.g., bank 508A, bank 508B, bank 508C, bank 508D, bank 508N, etc.) comprise NAND Flash dies or other configurations of non-volatile memory. In one embodiment, the memory banks (e.g., bank 508A, bank 508B, bank 508C, bank 508D, bank 508N, etc.) comprise a memory array.

The memory banks (e.g., bank 508A, bank 508B, bank 508C, bank 508D, bank 508N, etc.) are managed by controller 506. In some embodiments, the controller 506 comprises a computing device configured to mediate access to and from banks (e.g., bank 508A, bank 508B, bank 508C, bank 508D, bank 508N, etc.). In one embodiment, the controller 506 comprises an ASIC or other circuitry installed on a printed circuit board housing the memory banks (e.g., bank 508A, bank 508B, bank 508C, bank 508D, bank 508N, etc.). In some embodiments, the controller 506 may be physically separate from the memory banks (e.g., bank 508A, bank 508B, bank 508C, bank 508D, bank 508N, etc.). The controller 506 communicates with the memory banks (e.g., bank 508A, bank 508B, bank 508C, bank 508D, bank 508N, etc.) over interface 512. In some embodiments, this interface 512 comprises a physically wired (e.g., traced) interface. In other embodiments, interface 512 comprises a standard bus for communicating with memory banks (e.g., bank 508A, bank 508B, bank 508C, bank 508D, bank 508N, etc.).

The controller 506 comprises various modules, including local cache 514, firmware 516, and ECC module 518. In one embodiment, the various modules (e.g., local cache 514, firmware 516, and ECC module 518) comprise various physically distinct modules or circuits. In other embodiments, the modules (e.g., local cache 514, firmware 516, and ECC module 518) may completely (or partially) be implemented in software or firmware.

As illustrated, firmware 516 comprises the core of the controller and manages all operations of controller 506. The firmware 516 may implement some or all of the methods described above. Specifically, firmware 516 may implement the methods described in the foregoing figures.

Figure 6:
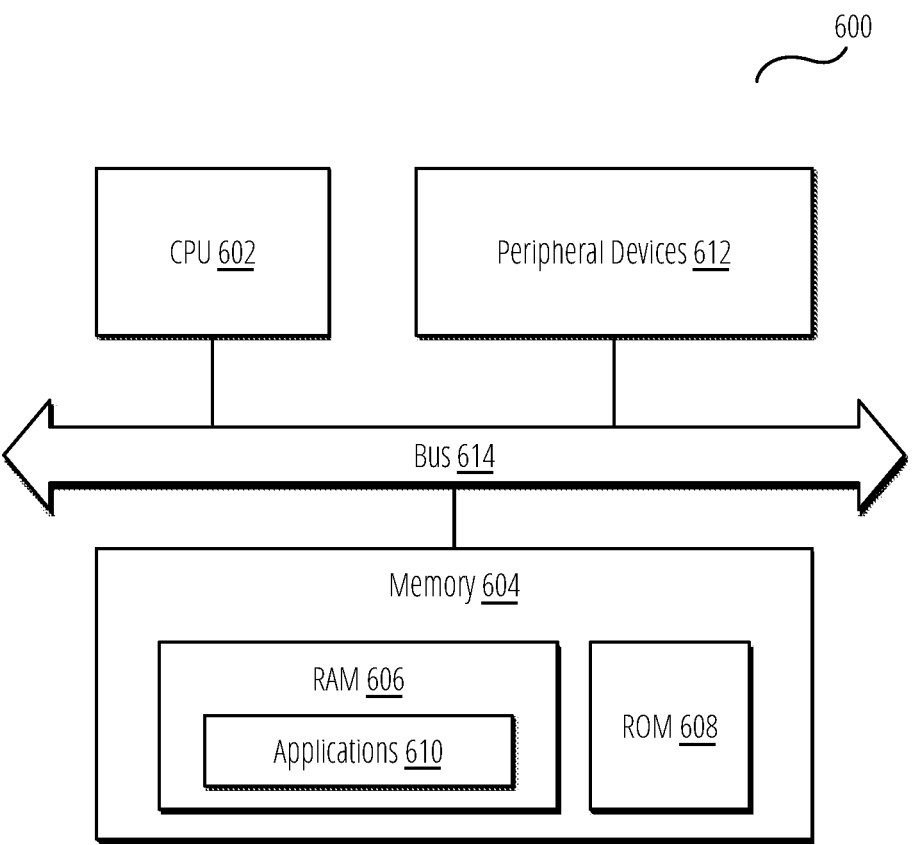
FIG. 6 is a block diagram of a computing device.

FIG. 6 is a block diagram of a computing device.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboards, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, bus 614 may comprise a Peripheral Component Interconnect Express (PCIe) bus. In some embodiments, bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608, for controlling the low-level operation of the device. The memory can also store an operating system in random-access memory (RAM) for controlling the operation of the device.

Applications 610 may include computer-executable instructions that, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 6, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

These computer program instructions can be provided to a processor of a general purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and, as such, are not to be limited by the foregoing exemplary embodiments and examples. In other words, functional elements being performed by single or multiple components, in various combinations of hardware and software or firmware, and individual functions, may be distributed among software applications at either the client level or server level, or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software, or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

I claim:

1. A system comprising:
a storage array;
a controller configured to detect a shutdown event; and
an auto-measure circuit configured to:
    generate, during a shutdown sequence initiated by the shutdown event, a plurality of measurements corresponding to a plurality of layers of a boot sequence, each layer comprising executable code used to generate a respective measurement;
    compare the plurality of measurements to a respective plurality of golden measurements;
    update flags associated with the plurality of layers based on the comparing;
    instruct the controller to shut down the system after updating the flags; and
    perform a forced reboot after detecting the shutdown event and before generating the plurality of measurements.

2. The system of claim 1, wherein a given measurement in the plurality of measurements comprises a hash of a corresponding layer's executable code.

3. The system of claim 2, wherein the hash comprises a trusted computing base component identifier (TCI).

4. The system of claim 1, wherein updating the flags comprises setting a flag to a positive value if a corresponding measurement matches an expected golden measurement and setting the flag to a negative value if a corresponding measurement does not match an expected golden measurement.

5. The system of claim 1, the auto-measure circuit further configured to:
detect a startup event;
select a layer from the plurality of layers;
read a flag associated with the layer;
execute the layer if the flag is set to a positive value and setting the flag to a negative value after executing the layer; and
prevent execution of the layer if the flag is set to a negative value.

6. The system of claim 5, wherein preventing execution of the layer comprises one or more of:
re-computing a new measurement of the layer, comparing the new measurement to a corresponding golden measurement, and executing the layer if the new measurement matches the corresponding golden measurement;
rolling back the layer to a previous version of the layer;
booting to safe mode; and
alerting a user that the layer is compromised.

7. A method comprising:

detecting a shutdown event of a device;

generating, during a shutdown sequence initiated by the shutdown event, a plurality of measurements corresponding to a plurality of layers of a boot sequence, each layer comprising executable code used to generate a respective measurement;

comparing the plurality of measurements to a respective plurality of golden measurements;

updating flags associated with the plurality of layers based on the comparing;

shutting down the device after updating the flags; and performing a forced reboot after detecting the shutdown event and before generating the plurality of measurements.

8. The method of claim 7, wherein a given measurement in the plurality of measurements comprises a hash of a corresponding layer's executable code.

9. The method of claim 8, wherein the hash comprises a trusted computing base component identifier (TCI).

10. The method of claim 7, wherein updating the flags comprises setting a flag to a positive value if a corresponding measurement matches an expected golden measurement and setting the flag to a negative value if a corresponding measurement does not match an expected golden measurement.

11. The method of claim 7, further comprising:

starting up the device;

selecting a layer from the plurality of layers;

reading a flag associated with the layer;

executing the layer if the flag is set to a positive value and setting the flag to a negative value after executing the layer; and preventing execution of the layer if the flag is set to a negative value.

12. The method of claim 11, wherein preventing execution of the layer comprises one or more of:

re-computing a new measurement of the layer, comparing the new measurement to a corresponding golden measurement, and executing the layer if the new measurement matches the corresponding golden measurement;

rolling back the layer to a previous version of the layer;

booting to safe mode; and alerting a user that the layer is compromised.

13. A non-transitory computer-readable storage medium for tangibly storing computer program instructions capable of being executed by a computer processor, the computer program instructions defining steps of:

detecting a shutdown event of a device;

generating, during a shutdown sequence initiated by the shutdown event, a plurality of measurements corresponding to a plurality of layers of a boot sequence, each layer comprising executable code used to generate a respective measurement;

comparing the plurality of measurements to a respective plurality of golden measurements;

updating flags associated with the plurality of layers based on the comparing;

shutting down the device after updating the flags; and performing a forced reboot after detecting the shutdown event and before generating the plurality of measurements.

14. The non-transitory computer-readable storage medium of claim 13, wherein a given measurement in the plurality of measurements comprises a hash of a corresponding layer's executable code.

15. The non-transitory computer-readable storage medium of claim 14, wherein the hash comprises a trusted computing base component identifier (TCI).

16. The non-transitory computer-readable storage medium of claim 13, wherein updating the flags comprises setting a flag to a positive value if a corresponding measurement matches an expected golden measurement and setting the flag to a negative value if a corresponding measurement does not match an expected golden measurement.

17. The non-transitory computer-readable storage medium of claim 13, further comprising:

starting up the device;

selecting a layer from the plurality of layers;

reading a flag associated with the layer;

executing the layer if the flag is set to a positive value and setting the flag to a negative value after executing the layer; and preventing execution of the layer if the flag is set to a negative value.

* * * * *